United States Patent
Kondo et al.

(10) Patent No.: US 10,144,112 B2
(45) Date of Patent: Dec. 4, 2018

(54) BLAST TREATMENT DEVICE AND BLAST TREATMENT METHOD

(71) Applicant: FUJI JUKOGYO KABUSHIKI KAISHA, Tokyo (JP)

(72) Inventors: Yoshihiko Kondo, Tochigi (JP); Hirotsugu Takazawa, Tochigi (JP); Shinya Matsuo, Tokyo (JP); Tatsuo Nakahata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 321 days.

(21) Appl. No.: 14/829,002

(22) Filed: Aug. 18, 2015

(65) Prior Publication Data

US 2016/0059385 A1  Mar. 3, 2016

(30) Foreign Application Priority Data

Aug. 28, 2014 (JP) .................. 2014-173884

(51) Int. Cl.
| | | |
|---|---|---|
| *B24B 7/00* | (2006.01) | |
| *B24C 7/00* | (2006.01) | |
| *B24C 3/06* | (2006.01) | |
| *B24C 1/06* | (2006.01) | |
| *B24C 9/00* | (2006.01) | |

(Continued)

(52) U.S. Cl.
CPC .............. *B24C 7/0046* (2013.01); *B24C 1/06* (2013.01); *B24C 3/04* (2013.01); *B24C 3/06* (2013.01); *B24C 3/062* (2013.01); *B24C 3/065* (2013.01); *B24C 9/003* (2013.01); *B24C 9/006* (2013.01); *B24C 11/00* (2013.01); *Y02P 70/179* (2015.11)

(58) Field of Classification Search
CPC .. B24C 3/04; B24C 3/06; B24C 3/065; B24C 3/067; B24C 9/003; B24C 9/006; B24C 11/00; B24C 7/0046; Y02P 70/179
See application file for complete search history.

(56) References Cited

U.S. PATENT DOCUMENTS

| 847,270 A | * | 3/1907 | Wise ...................... B24C 3/065 |
| | | | 451/87 |
| 2,597,434 A | * | 5/1952 | Bishop .................... B24C 3/065 |
| | | | 451/101 |

(Continued)

FOREIGN PATENT DOCUMENTS

| JP | S52-008599 | 3/1977 |
| JP | S62-028173 A | 2/1987 |

(Continued)

OTHER PUBLICATIONS

Extended European search report dated Jan. 26, 2016, in Patent Application No. 15 182 494.3 (7 pages).

(Continued)

*Primary Examiner* — Timothy V Eley
(74) *Attorney, Agent, or Firm* — Smith, Gambrell & Russell, LLP

(57) ABSTRACT

According to one implementation, a blast treatment device includes at least one nozzle that injects media toward a workpiece, a first tank that supplies the media to the at least one nozzle, a movement structure that moves the at least one nozzle and the first tank, and a second tank that supplies the media to the first tank. The second tank is not moved by the movement structure.

23 Claims, 4 Drawing Sheets

(51) Int. Cl.
*B24C 3/04* (2006.01)
*B24C 11/00* (2006.01)

(56) References Cited

U.S. PATENT DOCUMENTS

| | | | | |
|---|---|---|---|---|
| 2,770,924 A * | 11/1956 | Mead | ...................... | B24C 3/062 15/302 |
| 2,810,991 A * | 10/1957 | Mead | ...................... | B24C 3/065 15/321 |
| 3,447,272 A * | 6/1969 | Eppler | ...................... | B24C 3/22 451/38 |
| 3,553,895 A * | 1/1971 | Power | ...................... | B24C 9/003 451/102 |
| 4,044,507 A * | 8/1977 | Cox | ........................ | B24C 9/003 451/38 |
| 4,984,397 A * | 1/1991 | Van Leeuwen | ......... | B24C 3/065 451/100 |
| 4,993,200 A * | 2/1991 | Morioka | ................. | B24C 3/065 451/88 |
| 5,181,348 A | 1/1993 | Roemmele et al. | | |
| 5,353,729 A | 10/1994 | Goldbach et al. | | |
| 5,529,530 A * | 6/1996 | McPhee | ................... | B24C 3/06 451/38 |
| 5,545,074 A * | 8/1996 | Jacobs | .................... | B24C 3/065 451/102 |
| 6,132,296 A | 10/2000 | Mansfield | | |
| 6,390,898 B1 * | 5/2002 | Pieper | ..................... | B08B 3/024 451/100 |
| 7,182,671 B1 * | 2/2007 | Shimizu | .................. | B24C 3/065 451/38 |
| 7,416,471 B2 | 8/2008 | Shimizu et al. | | |
| 2004/0053561 A1 * | 3/2004 | Pieper | ..................... | B24C 1/04 451/38 |
| 2007/0042676 A1 | 2/2007 | Shimizu et al. | | |
| 2007/0218808 A1 | 9/2007 | Shimizu et al. | | |
| 2009/0107629 A1 | 4/2009 | Oguri | | |
| 2016/0051976 A1 * | 2/2016 | Yoshikawa | .............. | B01J 38/00 502/20 |
| 2016/0059386 A1 | 3/2016 | Kondo et al. | | |

FOREIGN PATENT DOCUMENTS

| | | |
|---|---|---|
| JP | H04-74868 A | 3/1992 |
| JP | 3023883 U | 2/1996 |
| JP | 2001-113465 A | 4/2001 |
| JP | 2007-244980 | 9/2007 |
| JP | 2009-298644 | 12/2009 |
| JP | 2013-215826 | 10/2013 |
| WO | 2012/117748 A1 | 9/2012 |

OTHER PUBLICATIONS

U.S. Appl. No. 14/828,936, Kondo, et al., filed Aug. 18, 2015.
First Chinese Office Action dated May 31, 2018 in CN Patent Application No. 201510523243.8 (8 pages in Chinese with English machine translation).
First Japanese Office Action dated Mar. 20, 2018 in JP Patent Application No. 2014-173884 (4 pages in Japanese with English Translation).
First Japanese Office Action dated Mar. 27, 2018 in JP Patent Application No. 2014-173839 (4 pages in Japanese with English Translation).
Japanese Office Action dated Jul. 3, 2018 in JP Patent Application No. 2014-173839 (3 pages in Japanese with English machine translation).
Japanese Office Action dated Jul. 3, 2018 in JP Patent Application No. 2014-173884 (4 pages in Japanese with English machine translation).

* cited by examiner

BLAST TREATMENT DEVICE AND BLAST TREATMENT METHOD

CROSS REFERENCES TO RELATED APPLICATIONS

This application is based upon and claims the benefit of priority from Japanese Patent Application No. 2014-173884, filed on Aug. 28, 2014; the entire contents of which are incorporated herein by reference.

FIELD

Implementations described herein relate generally to a blast treatment device and a blast treatment method.

BACKGROUND

Conventionally, in case of painting or bonding a composite material, such as GFRP (glass fiber reinforced plastics) or CFRP (carbon fiber reinforced plastics), which is used as a material of aircraft parts or the like, blast treatment as pretreatment is performed for the surface of the composite material.

In particular, an aircraft part, such as a panel, has a meter order in size and very large. Therefore, blast treatment by the conventional blast treatment device having a multijoint arm requires to prepare a very long and large scale arm.

Thus, a blast treatment device which can move a position of a nozzle, for injecting media of blast treatment, relative to a workpiece by a slide mechanism has been devised so that the blast treatment of a workpiece having a large size or a complicated form can be performed flexibly (for example, refer to Japanese Patent Application Publication No. 2013-215826).

An object of the present invention is to provide a blast treatment device and a blast treatment method which can perform blast treatment under more satisfactory conditions.

SUMMARY OF THE INVENTION

In general, according to one implementation, a blast treatment device includes at least one nozzle that injects media toward a workpiece, a first tank that supplies the media to the at least one nozzle, a movement structure that moves the at least one nozzle and the first tank, and a second tank that supplies the media to the first tank. The second tank is not moved by the movement structure.

Further, according to one implementation, a blast treatment method includes: supplying media, to a first tank, from a second tank; and manufacturing a blast treated product by supplying the media from the first tank to at least one nozzle and injecting the supplied media toward a workpiece, with moving the first tank and the at least one nozzle.

BRIEF DESCRIPTION OF THE DRAWINGS

In the accompanying drawings.

DETAILED DESCRIPTION

A blast treatment device and a blast treatment method according to implementations of the present invention will be described with reference to the accompanying drawings.

(Structure and Function)

Figure 1:
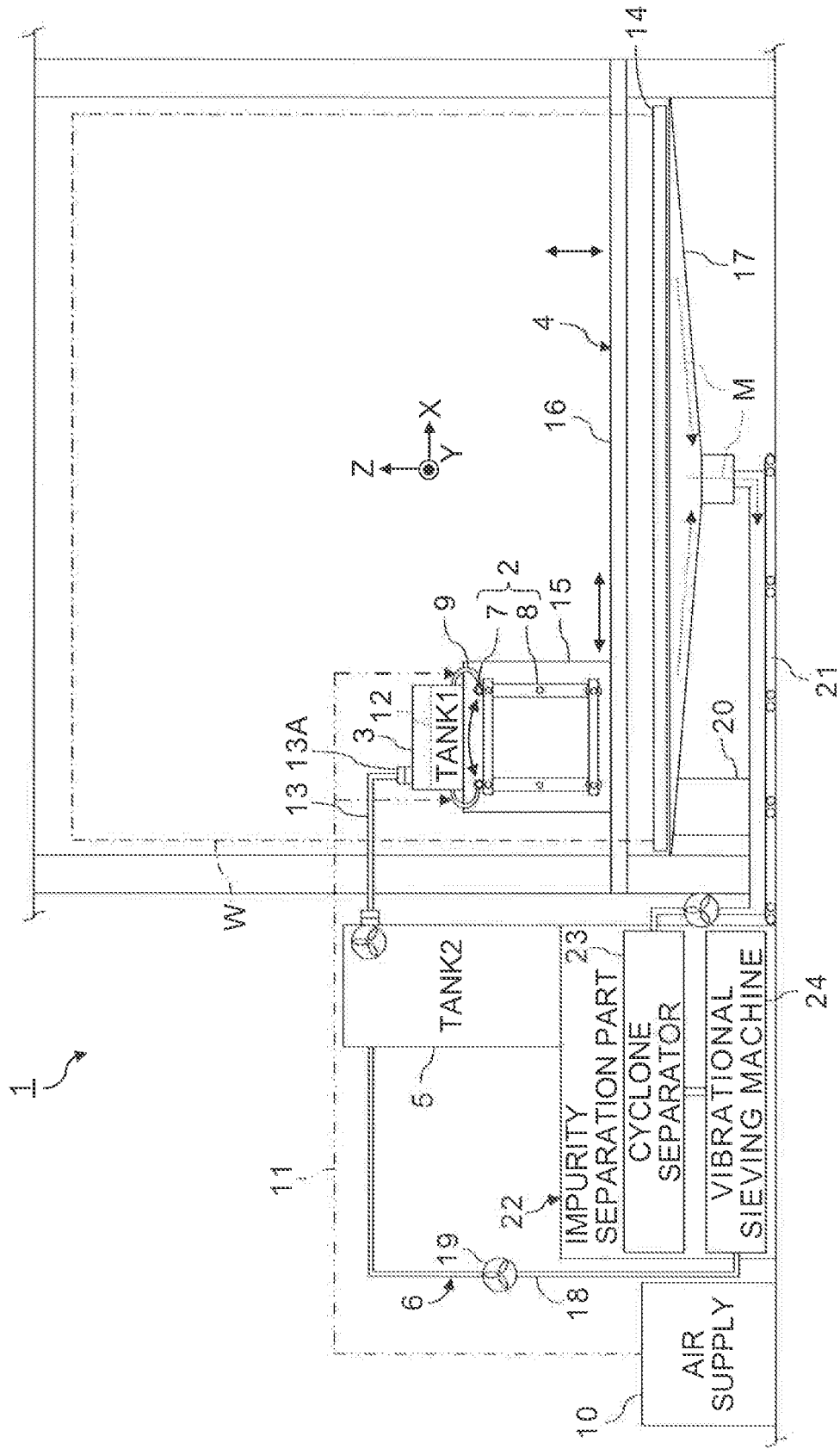
FIG. 1 is a front view of a blast treatment device according to an implementation of the present invention.
Figure 2:
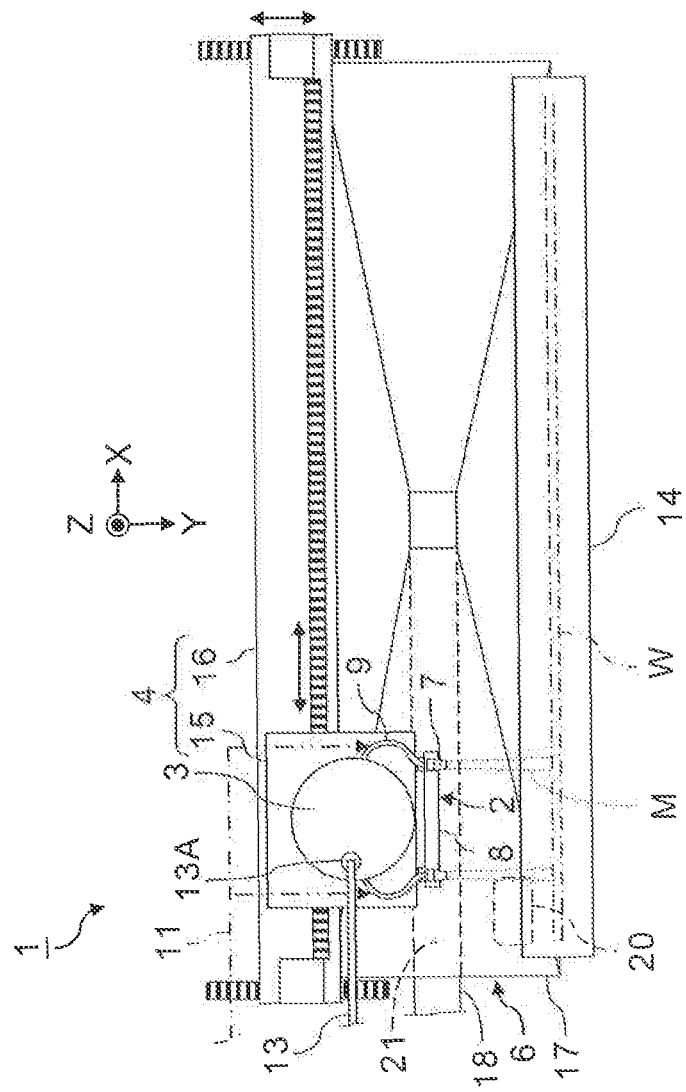
FIG. 2 is a top view of a processing area of the blast treatment device shown in FIG. 1.

FIG. 1 is a front view of a blast treatment device according to an implementation of the present invention, and FIG. 2 is a top view of a processing area of the blast treatment device shown in FIG. 1.

A blast treatment device 1 performs blast treatment of a workpiece W made with a desired material, for a desired purpose. A case of performing shot blasting in order to activate a surface of a workpiece W made with a composite material, such as CFRP or GFRP, before painting or bonding will be described here. As a matter of course, blast treatment can also be performed in a similar way in case of performing blast treatment for another purpose.

In case of performing blast treatment in order to activate a surface of a workpiece W made with a composite material before painting or bonding, granular media (projection material) M are made to collide on the workpiece W to roughen the surface so that the wettability of a paint or an adhesive can be improved. Hard particles, such as ceramic, are a typical example of the media M for blast treatment of a composite material. More specifically, ceramic particles, such as alumina, silica, silicon carbide or zirconia particles, can be used as the media M for blast treatment.

The blast treatment device 1 has a blast injection part 2, the first tank 3, a moving mechanism 4, the second tank 5 and a circulating system 6.

The blast injection part 2 has at least one nozzle 7, which injects the media M toward the workpiece W, and a nozzle swing part 8 which swings the nozzle 7 or the nozzles 7 along an arc-like locus like a wiper. In the illustrated example, the blast injection part 2 has the two nozzles 7. Furthermore, a linkage mechanism for swinging the two nozzles 7 is installed as the nozzle swing part 8. Note that, the nozzle swing part 8 may be omitted.

The first tank 3 is a reservoir tank for supplying the media M to each nozzle 7. It is appropriate to couple the first tank 3 and the nozzles 7 by the first hoses 9, whose lengths are constant, respectively. The nozzles 7 are coupled to an air supply system 10, which generates and supplies compressed air, by air supply hoses 11, besides the first tank 3. Typically, the air supply hoses 11 are coupled to the first hoses 9. Therefore, the media M can be injected from the respective nozzles 7 by the compressed air supplied from the air supply system 10 through the air supply hoses 11. Note that, it is desirable to install a filter 12 in the first tank 3 so that the media M are not discharged out of the first tank 3.

Meanwhile, the second tank 5 is a reservoir tank for supplying the media M to the first tank 3. Preferably, the second tank 5 is coupled to the first tank 3 by the second hose 13 having a detachable mechanism 13A, such as a coupler. This is because the second hose 13 can be detached for preventing an interference, except for the time of supplying the media M from the second tank 5 to the first tank 3, when the second hose 13 having the detachable mechanism 13A connects between the first tank 3 and the second tank 5.

The moving mechanism 4 has a function to move the nozzles 7 and the first tank 3. Furthermore, the moving mechanism 4 may be configured to move a table 14 for placing the workpiece W. Meanwhile, the second tank 5 does not move by the moving mechanism 4. In the illustrated example, the moving mechanism 4 has a holding part 15, which fixes the blast injection part 2 and the first tank 3, and a driving mechanism 16, which moves the holding part 15 in three-axis directions of the X-axis, the Y-axis and the Z-axis directions. That is, the moving mechanism 4 is a gondola type of one which fixes the blast injection part 2 and the first tank 3 to the holding part 15 and moves the holding part 15 in the horizontal direction and the vertical direction by the driving mechanism 16.

A structure of the moving mechanism 4 is arbitrary as long as the structure can move the blast injection part 2 and the first tank 3 in one desirable axis direction or a plurality of desirable axis directions. Therefore, the moving mechanism 4 can be configured using a variety of elements, such as a linkage mechanism, a slide mechanism and/or a multijoint arm. As a practical example, the nozzles 7 may be configured to be able to be tilted in a desired direction from the workpiece W.

Furthermore, it is desirable to make a capacity of the first tank 3 smaller than a capacity of the second tank 5 from a viewpoint of simplifying a scale of the moving mechanism 4. Specifically, when a sufficient amount of the media M are reserved in the second tank 5 while a necessary amount of the media M for blast treatment are supplied to the first tank 3 as needed, the first tank 3 can be miniaturized in size. As a result, rigidities required for the holding part 15 and the moving 4 can be reduced.

The circulating system 6 recovers the media M after the injection and supplies the recovered media M to the second tank 5 and the blast injection part 2. For example, the circulating system 6 can be composed of a duct 17, which recovers the fallen media M, a recovery hose 18, which moves the media M discharged from the outlet of the duct 17 to the second tank 5, and at least one fan 19, which forms an air flow for moving the media M in the recovery hose 18. The duct 17 may have a vibration device 20 for shaking off the media M. Furthermore, the circulating system 6 can also use a desirable device, such as a belt conveyor 21 which conveys the media M, as illustrated. Note that, the fan 19 can be placed not only in the circulating system 6 but also in an arbitrary position on a pathway of the media M, as necessary.

In particular, in case of reusing the media M after the injection, using alumina whose nominal designation number is No. 100 (#100) contributes to improve a recovery rate of the media M. The nominal designation number shows a particle size range (a range of average particle size). Alumina #100 are particles whose granularity range is from 106 μm to 150 μm.

Conventionally, alumina #180 whose particle size range is from 53 μm to 90 μm has been considered to be preferable as media for blast treatment of a composite material. Alumina #100 has a larger average particle size compared to alumina #180. Therefore, when alumina #100 is used, clogging by ceramic particles solidified due to moisture, in the pathway of the media, can be prevented satisfactorily, compared to a case where alumina #180 is used.

For example, clogging of the media M in the filter 12 installed in the first tank 3 can be prevented. Furthermore, clogging of the media M in filters installed in a variety of parts can also be prevented. As a result, structures of elements, including the first tank 3, the first hoses 9, the second tank 5 and the second hose 13, on the pathway of the media M can be simplified. Furthermore, the frequency of exchanging the filters and the frequency of cleaning elements, which are on the pathway of the media M, can also be reduced. Thereby, maintaining elements on the pathway of the media M becomes easier.

In addition, the weight of alumina #100 is larger than that of alumina #180. Therefore, an amount of scattering of alumina #100 to the outside of the duct 17 is less than that of alumina #180. That is, when alumina #100 is used as the media M, an amount of the media M falling toward the duct 17 after the injection can be increased, compared to a case where alumina #180 is used. As a result, a recovery rate of the media M can be improved.

It can be considered that using not only alumina but ceramic particles whose particle size range is from 106 μm to 150 μm can prevent clogging in the pathway of the media M. In addition, it can be considered that ceramic particles whose particle size range is from 106 μm to 150 μm have enough weight to fail toward the duct 17. Therefore, it is preferable to use alumina or ceramic particles other than alumina, whose particle size range is from 106 μm to 150 μm, as the media M.

Furthermore, the circulating system 6 can have an impurity separation part 22 which removes at least one of impurities and the media M, whose particle sizes have become small, included in the recovered media M. The impurity separation part 22 can be composed of at least one of a cyclone separator (powder separator) 23 and a vibrational sieving machine 24. Note that, it is preferable to configure the impurity separation part 22 by both the cyclone separator 23 and the vibrational sieving machine 24 from a viewpoint of securing a satisfactory separation capacity of impurities from the media M.

Figure 3:
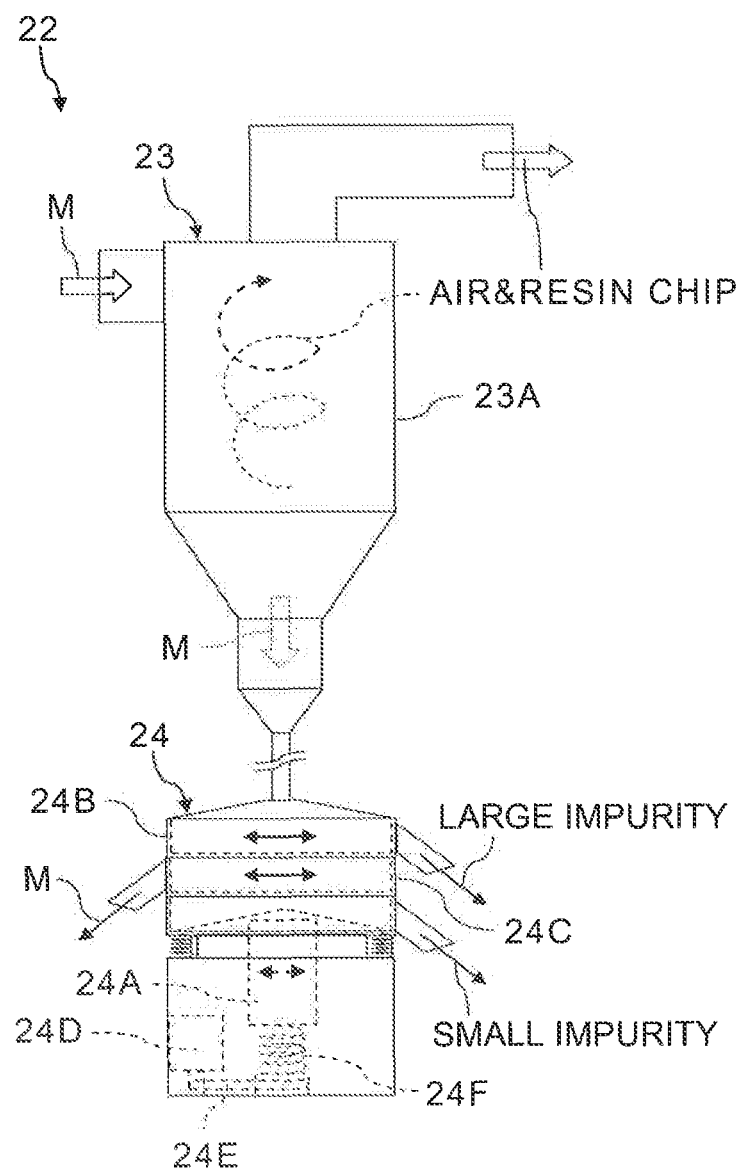
FIG. 3 shows an example of detailed structure of the impurity separation part shown in FIG. 1.

FIG. 3 shows an example of detailed structure of the impurity separation part 22 shown in FIG. 1.

As shown in FIG. 3, the impurity separation part 22 can be configured by connecting the vibrational sieving machine 24 to the subsequent part of the cyclone separator 23.

The cyclone separator 23 is a centrifuge which forms a swirl of air by flowing air including powders, such as the media M and impurities, into the inside of a cylinder 23A so that the powders in the air are separated by the centrifugal force. When the air including the powders, such as the media M and the impurities, is introduced into the cyclone separator 23, powders each having a light weight, such as resin particles scraped away from a composite material by the blast treatment and the media M which have become fine, are discharged upward with the air. Meanwhile, powders each having a heavy weight, such as the media M which hit on a wall surface inside the cyclone separator 23 by the centrifugal force, fall by the action of the gravity. As a result, the powders each having the heavy weight, such as the media M, in the air can be selectively recovered.

In order to satisfactorily separate the media M from resin particles in the cyclone separator 23, it is important to raise a difference between a weight of the medium M and a weight of each resin particle. Therefore, it is appropriate to inject the media M, each having a weight difference not less than a threshold or more than the threshold from each resin particle dropped from a composite material, toward the workpiece W. The threshold for determining the weight difference between the media M and the resin can be empirically determined by blast treatment tests.

According to blast treatment tests which have been actually performed, it has been confirmed that using alumina #100 as the media M is preferable in case of performing blast treatment of a composite material, such as CFRP, from a viewpoint of preventing clogging due to humidity, improving a recovery rate of the media M by reducing the amount of scattering of the media M to the outside of the duct 17, and satisfactorily separating the media M from resin chips. This can be considered to be similar also in case of using ceramic particles other than alumina, as long as their particle size range is from 106 μm to 150 μm, since those ceramic particles have enough weight differences from resin chips.

When a certain amount of the media M from which lightweight impurities, such as resin chips, have been removed are recovered by the cyclone separator 23, the recovered media M are put into the vibrational sieving machine 24.

The vibrational sieving machine 24 separates powders having different particle sizes by vibrating sieves 24B and 24C with a vibrating body 24A. The typical vibrational sieving machine 24 is configured to vibrate the sieves 24B and 24C together with the vibrating body 24A by transmitting rotation of a motor 24D to a driving spring 24F through a belt 24E.

In particular, using the two stage vibrational sieving machine 24 which includes two sieving nets having different opening sizes allows screening the media M in a specific particle size range.

As a specific example, when ceramic particles, such as alumina #100, whose particle size range is from 106 μm to 150 μm are used as the media M, what is necessary is to install the vibrational sieving machine 24, for selectively extracting the ceramic particles whose particle size range is from 106 μm to 150 μm, in the impurity separation part 22. Specifically, the two stage vibrational sieving machine 24 composed of the first sieve 24B, having larger openings than 150 μm, and the second sieve 24C, having smaller openings than 106 μm, disposed below the first sieve 24B can be used so that particles whose particle size range is from 106 μm to 150 μm can be sorted out.

When the above-mentioned vibrational sieving machine 24 is used, impurities whose particle sizes are larger than the particle size range of the media M can be separated by the first sieve 24B while impurities whose particle sizes are smaller than the particle size range of the media M, such as the media M whose particle sizes have become small, can be separated by the second sieve 24C. Thereby, the high purity media M having an appropriate particle size range can be obtained and reused for blast treatment.

(Operation and Action)

Next, a blast treatment method using the blast treatment device 1 will be described.

Figure 4:
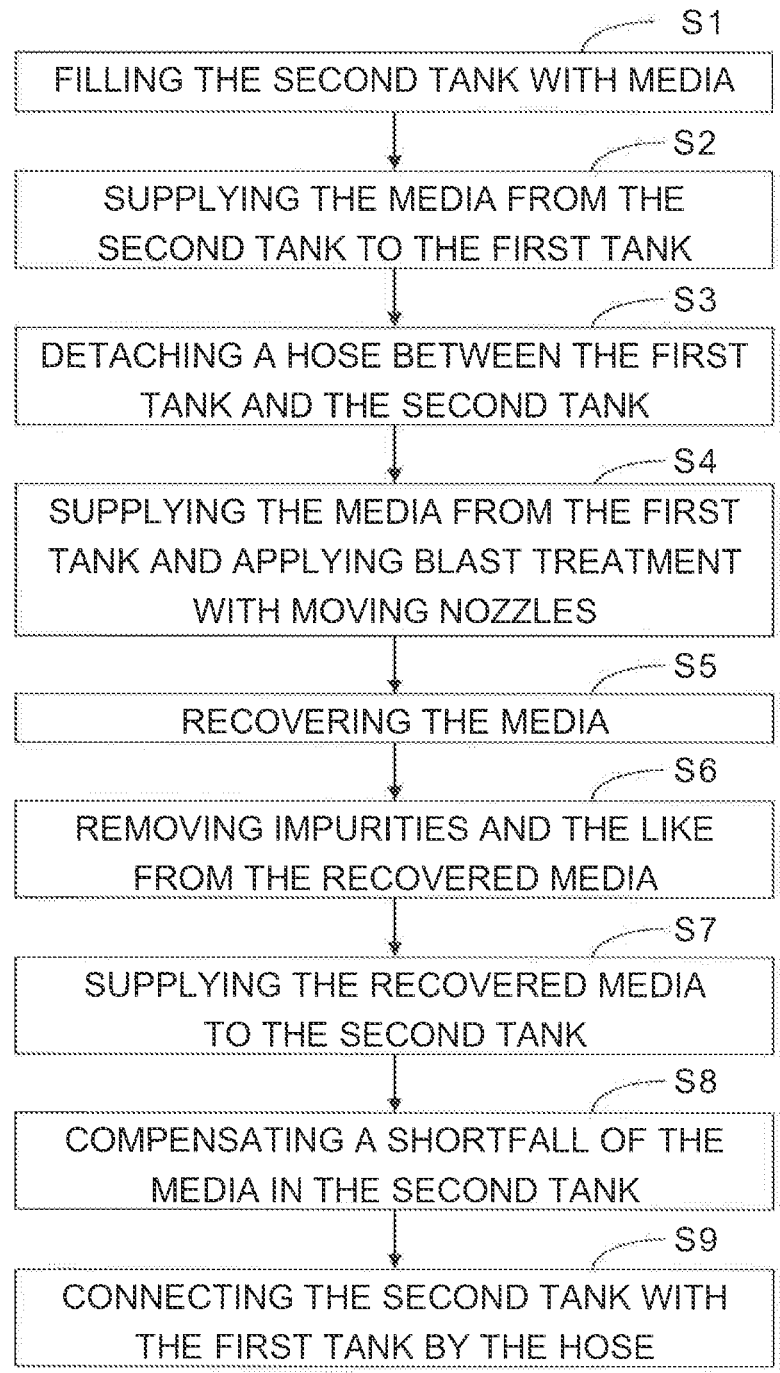
FIG. 4 is a flow chart showing an example of flow of blast treatment by the blast treatment device shown in FIG. 1.

FIG. 4 is a flow chart showing an example of flow of blast treatment by the blast treatment device 1 shown in FIG. 1.

Firstly, in step S1, the second tank 5 is filled up with the media M, such as alumina #100. Next, in step S2, the media M are supplied from the second tank 5 to the first tank 3 through the second hose 13. Next, in step S3, the second hose 13 between the first tank 3 and the second tank 5 is detached. Thereby, preparation for blast treatment is completed. Therefore, a workpiece W which is a target of blast treatment can be placed.

Next, in step S4, the driving mechanism 16 of the moving mechanism 4 moves the holding part 15, with which the blast injection part 2 and the first tank 3 have been fixed, according to a blast treatment position of the workpiece W. Furthermore, the nozzle swing part 8 is driven to swing the two nozzles 7 from side to side. Meanwhile, compressed air is supplied from the air supply system 10 to the first hoses 9 through the air supply hoses 11. Thereby, the media M are supplied from the first tank 3 to the two swinging nozzles 7 through the first hoses 9. Then, the media M are injected toward the workpiece W from each of the two swinging nozzles 7. As a result, blast treatment is applied on a surface of the workpiece W.

The blast treatment of the workpiece W can be performed not only during swinging the nozzles 7 by the nozzle swing part 8 but also during moving the blast injection part 2 by the driving mechanism 16. Specifically, the media M, supplied from the first tank 3 to the nozzles 7 with moving the first tank 3 and the nozzles 7 by the driving mechanism 16, can be injected toward the workpiece W. Therefore, blast treatment of the workpiece W, having a large size, like an aircraft part can be performed continuously with changing injected positions of the media M.

Furthermore, the first tank 3 has been coupled to the respective nozzles 7 by the first hoses 9 whose lengths are constant. Therefore, the length of a pathway of the media M between the first tank 3 and each nozzle 7 is constant. Hence, the media M can be injected with an equivalent pressure constantly during movement of the blast injection part 2.

Meanwhile, the second hose 13 between the first tank 3 and the second tank 5 has been detached before the blast treatment. Specifically, the pathway of the media M between the first tank 3 and the second tank 5 is changed into the disconnected state in the interval after supplying the media M from the second tank 5 to the first tank 3 and before moving the first tank 3 and the nozzle 7. Therefore, interference by the second hose 13 can be avoided even when the first tank 3 has moved.

When the media M are injected to all injection positions of the workpiece W the required number of times by swinging the nozzles 7 and moving the blast injection part 2, a blast treated product can be manufactured as the composite material after the blast treatment. Then, the blast treated product after the blast treatment is taken out from the blast treatment device 1.

Next, in step S5, the media M after the injection are recovered by the circulating system 6. In case of the blast treatment device 1 having the structure shown in FIG. 1, the vibration device 20 vibrates the duct 17. Thereby, the media M fallen into the duct 17 are discharged from the outlet of the duct 17 to the recovery hose 18. On the other hand, the fan 19 rotates so that the media M in the recovery hose 18 move.

Next, in step S6, impurities included in the recovered media M and the media M whose particle sizes have become small are removed by the impurity separation part 22. The cyclone separator 23 and the vibrational sieving machine 24 can be used for removing the impurities or the like.

The cyclone separator 23 can separate impurities, such as resin chips having light weights and the media M which have become fine, from the media M. Meanwhile, the vibrational sieving machine 24 can sort out the media M in an appropriate particle size range. In particular, in case of using alumina #100 or ceramic particles whose particle size range is similar to that of alumina #100, as the media M, the impurities, such as resin chips, can be easily separated from the media M because of an enough weight difference and volume difference between the media M and the impurities.

Next, in step S7, the media M after the removal of the impurities and the media M whose particle sizes have become small are supplied to the second tank 5. Thereby, the recovered media M are preserved for the next blast treatment.

Note that, an amount of the media M filled in the second tank 5 may be insufficient depending on a recovery rate of the media M. In that case, a shortfall of the media M is compensated in the second tank 5 in step S8. When the second tank 5 is filled up with a sufficient amount of the media M, the second tank 5 is coupled to the first tank 3 by the second hose 13 in step S9. Thereby, the blast treatment can restart by reusing the media M.

That is, the blast treatment device 1 and the blast treatment method as described above are a device and a method which dispose a tank, for reserving the media M for blast treatment, at both the vicinity of the blast injection part 2, which moves by the moving mechanism 4, and an arbitrary position, which does not move by the moving mechanism 4. Thereby, blast treatment can be performed with moving the blast injection part 2 after once supplying the media M from the second tank 5, which does not move by the moving mechanism 4, to the first tank 3 disposed near the blast injection part 2.

(Effects)

Therefore, according to the blast treatment device 1 and the blast treatment method as described above, a distance from the first tank 3 to each of the nozzles 7 can always be constant, whichever position the blast injection part 2 is moved to during blast treatment. In addition, even when the blast injection part 2 has a structure to swing the nozzles 7, the distance from the first tank 3 to each of the nozzles 7 can also always be constant during swinging the nozzles 7.

Therefore, an injection pressure of the media M can always be constant, regardless of positions of the blast injection part 2 and the nozzles 7. As a result, the media M can be supplied and injected stably. On the condition that the height of the blast injection part 2 changes during supplying the media M directly from the second tank 5 to the blast injection part 2, the injection pressure of the media M may also change, due to a change of a difference in height between the second tank 5 and the blast injection part 2.

By contrast, according to the blast treatment device 1 and the blast treatment method as described above, the blast injection part 2 and the first tank 3 have been fixed to the same holding part 15. Therefore, when a slight change in height of the nozzles 7 due to a swing is disregarded, a difference in height between the first tank 3 and the blast injection part 2 becomes substantially constant. Therefore, blast treatment can be performed more uniformly by stably supplying the media M even while the blast injection part 2 moves. In particular, blast treatment of a workpiece W having a large size can be performed uniformly.

Furthermore, it becomes easier to reuse the media M by the circulating system 6 and miniaturize the first tank 3 in size, by installing the second tank 5, which does not move by the moving mechanism 4, in the blast treatment device 1.

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A blast treatment device comprising:
   at least one nozzle that injects media toward a workpiece;
   a first tank that supplies the media to the at least one nozzle;
   a movement structure that moves the at least one nozzle and the first tank; and
   a second tank that supplies the media to the first tank through a media supply conduit, the second tank being configured not to be moved by the movement structure, and the first and second tanks and the media supply conduit are configured to have the media supply conduit in a media non-supply mode between the first and second tanks during movement of the movement structure and injection of the media toward the workpiece.

2. The blast treatment device according to claim 1, wherein the first tank is coupled to the second tank by the media supply conduit which is in the form of a hose having a detachable mechanism.

3. The blast treatment device according to claim 2, wherein a capacity of the first tank is made smaller than a capacity of the second tank.

4. The blast treatment device according to claim 3, further comprising:
   a circulating system that recovers the injected media and supplies recovered media to the second tank.

5. The blast treatment device according to claim 4, wherein the circulating system has an impurity separation part that removes, from the recovered media, particles having a size or weight falling below a threshold value with at least one of a cyclone separator and a vibrational sieving machine.

6. The blast treatment device according to claim 2, further comprising:
   a circulating system that recovers the injected media and supplies recovered media to the second tank.

7. The blast treatment device according to claim 6, wherein the circulating system has an impurity separation part that removes, from the recovered media, particles having a size or weight falling below a threshold value with at least one of a cyclone separator and a vibrational sieving machine.

8. The blast treatment device according to claim 1, wherein a capacity of the first tank is made smaller than a capacity of the second tank.

9. The blast treatment device according to claim 8, further comprising:
   a circulating system that recovers the injected media and supplies recovered media to the second tank.

10. The blast treatment device according to claim 9, wherein the circulating system has an impurity separation part that removes, from the recovered media, particles having a size or weight falling below a threshold value with at least one of a cyclone separator and a vibrational sieving machine.

11. The blast treatment device according to claim 1, further comprising:
    a circulating system that recovers the injected media and supplies recovered media to the second tank.

12. The blast treatment device according to claim 11, wherein the circulating system has an impurity separation part that removes, from the recovered media, particles having a size or weight falling below a threshold value with at least one of a cyclone separator and a vibrational sieving machine.

13. The blast treatment device according to claim 12, wherein the impurity separation part has a first stage removal section based on the weight difference between injected media and resinic particles sourced from the workpiece, and a second stage removal section that is downstream from the first stage removal section and separates, from the recovered media, selected media designed for return to the injection part, with the selected media having a predetermined size range that does not fall below or exceed, respectively, a lower first threshold value and a second, higher threshold value.

14. The blast treatment device according to claim 13 wherein the first stage removal section includes a cyclone separator for separation of resinic particles from injected media based on weight differential.

15. The blast treatment device according to claim 14 wherein the second stage removal section includes a plurality of sieve trays supported on a vibrating body.

16. A blast treatment method that utilizes the blast treatment device of claim 1, comprising:
   supplying media, to the first tank, from the second tank via the media supply conduit; and
   manufacturing a blast treated product by supplying the media from the first tank to the at least one nozzle and injecting the supplied media toward a workpiece, with moving the first tank and the at least one nozzle being carried out while the media supply conduit is in a non-media supply mode between the first and second tanks.

17. The blast treatment method according to claim 16, wherein a path length of the media between the first tank and the at least one nozzle is made constant.

18. The blast treatment method according to claim 17, wherein a pathway of the media between the first tank and the second tank is disconnected, by disconnecting the media supply conduit from at least one of the first and second tanks, after supplying the media from the second tank to the first tank and before moving the first tank and the at least one nozzle.

19. The blast treatment method according to claim 18, wherein ceramic particles of which an average particle size is from 106 μm to 150 μm are used as the media, further comprising:
   recovering the injected media;
   removing impurities and reduced in size injected media from the recovered media, by a cyclone separator and a vibrational sieving machine; and
   supplying the media, from which the impurities and the reduced in size media been removed, to the second tank.

20. The blast treatment method according to claim 17, wherein ceramic particles of which an average particle size is from 106 μm to 150 μm are used as the media, further comprising:
   recovering the injected media;
   removing impurities and reduced in size injected media from the recovered media, by a cyclone separator and a vibrational sieving machine; and
   supplying the media, from which the impurities and the reduced in size media have been removed, to the second tank.

21. The blast treatment method according to claim 16, wherein a pathway of the media between the first tank and the second tank is disconnected, by disconnecting the media supply conduit from at least one of the first and second tanks, after supplying the media from the second tank to the first tank and before moving the first tank and the at least one nozzle.

22. The blast treatment method according to claim 21, wherein ceramic particles of which an average particle size is from 106 μm to 150 μm are used as the media, further comprising:
   recovering the injected media;
   removing impurities and reduced in size injected media from the recovered media, by a cyclone separator and a vibrational sieving machine; and
   supplying the media, from which the impurities and the reduced in size media have been removed, to the second tank.

23. The blast treatment method according to claim 16, wherein ceramic particles of which an average particle size is from 106 μm to 150 μm are used as the media, further comprising:
   recovering the injected media;
   removing impurities and reduced in size injected media from the recovered media, by a cyclone separator and a vibrational sieving machine; and
   supplying the media, from which the impurities and the reduced in size injected media have been removed, to the second tank.

* * * * *